(12) United States Patent
Alazemi et al.

(10) Patent No.: US 12,185,678 B2
(45) Date of Patent: Jan. 7, 2025

(54) AUTOMATED HYDROPONICS SYSTEM

(71) Applicant: KUWAIT UNIVERSITY, Safat (KW)

(72) Inventors: Abdullah Jeluwi Nasser Alazemi, Safat (KW); Danah Hamad Sanad Almatar, Safat (KW); Hessah Salem Mohemmed Aljalahma, Safat (KW); Alreem Ahmad Abdullah Alsirhan, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 17/589,136

(22) Filed: Jan. 31, 2022

(65) Prior Publication Data

US 2023/0240211 A1     Aug. 3, 2023

(51) Int. Cl.
*A01G 31/02* (2006.01)
*A01G 27/02* (2006.01)

(52) U.S. Cl.
CPC .................... *A01G 31/02* (2013.01)

(58) Field of Classification Search
CPC ......... A01G 31/02; A01G 27/003; A01G 9/26
See application file for complete search history.

(56) References Cited

U.S. PATENT DOCUMENTS

| | | | |
|---|---|---|---|
| 986,426 A * | 3/1911 | Adams et al. ......... | A01C 1/025 47/16 |
| 2,296,849 A * | 9/1942 | Hammerstrom ....... | A01G 31/02 47/16 |
| 5,937,575 A * | 8/1999 | Zobel ..................... | A01G 31/02 47/62 A |
| 6,978,575 B1 * | 12/2005 | Bradley ............... | A01G 27/003 47/66.1 |
| 10,219,446 B2 * | 3/2019 | Paquette ............... | F21V 11/186 |
| 10,485,192 B2 * | 11/2019 | Van Wingerden ... | A01G 31/042 |
| 10,499,574 B2 * | 12/2019 | Lu .......................... | G08B 21/18 |
| 10,681,875 B2 * | 6/2020 | Klein ..................... | A01G 9/022 |
| 10,750,687 B2 * | 8/2020 | Everett ................ | A01G 27/003 |

(Continued)

FOREIGN PATENT DOCUMENTS

| | | |
|---|---|---|
| AU | 2021100024 | 4/2021 |
| CN | 211430450 | 9/2020 |
| ES | 2 400 645 | 4/2013 |

OTHER PUBLICATIONS

"Gardyn," 2021 Gardyn.

*Primary Examiner* — Monica L Perry
(74) *Attorney, Agent, or Firm* — Nath, Goldberg & Meyer; Joshua B. Goldberg

(57) ABSTRACT

An automated hydroponics system includes a plant housing, a power source, a microcontroller, and a handheld device. The plant housing includes a platform for supporting a plant, a main solution container for storing water to be supplied to the plant, and a plurality of supplemental solution containers including a low pH solution container, a high pH solution container, and a nutrient solution container. The main solution container is connected to the supplemental solution containers by one or more water-supply conduits. The main solution container can include a pH level sensor configured for detecting pH levels in the main solution, a TDS sensor for detecting a level of total dissolved solids in the main solution a temperature sensor for monitoring a temperature of the main solution, a water level sensor for monitoring a level of the main solution, and one or more pumps.

14 Claims, 5 Drawing Sheets

(56) References Cited

U.S. PATENT DOCUMENTS

| | | |
|---|---|---|
| 10,750,689 B2 | 8/2020 | Olesen et al. |
| 11,206,773 B2 * | 12/2021 | Wilcox .................. A01G 31/06 |
| 11,458,499 B2 * | 10/2022 | Erickson ................. A01G 7/02 |
| 11,553,656 B2 * | 1/2023 | Song ..................... A01G 7/045 |
| 11,659,796 B2 * | 5/2023 | Lefers .................. A01K 63/045 |
| | | 119/246 |
| 2012/0000128 A1 * | 1/2012 | Rochefort .............. A01G 31/02 |
| | | 47/62 R |
| 2019/0257106 A1 * | 8/2019 | Baker ....................... E04H 5/08 |
| 2019/0307087 A1 | 10/2019 | Lee et al. |
| 2020/0100444 A1 | 4/2020 | Lu et al. |
| 2020/0221646 A1 * | 7/2020 | Bacolas ............... A01G 27/003 |
| 2021/0112728 A1 * | 4/2021 | Fonseca dos Reis .. A01G 9/023 |
| 2022/0225579 A1 * | 7/2022 | Robell ................... H05B 47/11 |
| 2022/0369566 A1 * | 11/2022 | Venkata .................. A01G 9/16 |

* cited by examiner

AUTOMATED HYDROPONICS SYSTEM

BACKGROUND

Field

The disclosure herein relates to the field of hydroponics, and particularly, an automated hydroponics system for plant cultivation.

Description of the Prior Art

There are several obstacles towards plant care for residential applications. First, residential gardeners may not have access to a sufficient amount or quality of soil (i.e. poor nutrient composition). Secondly, available soil may not respond to regular irrigation techniques and, therefore, may not be sufficient for plant growth. Third, weather conditions for particular residential gardening applications may not be suitable for robust plant growth based on particular geographies. In the particular case of an arid and soil poor environment, the main obstacle is weather conditions.

Irrigation techniques for plants grown in soil generally require a significant amount of water and time for growth of the plant. Moreover, many plant diseases are associated with pests in the soil. As such, plants grown in soil can exhibit wilting, brown leaves, and root rot. Decreasing levels of plant growth in many countries has resulted in high air pollution levels and increased spread of dust.

Hydroponics is a method of cultivation that does not require the use of soil. Instead, a mixture of water and nutrients is supplied to plants. The primary nutrients in the mixture provided to the plant are nitrogen, phosphorus, and potassium. Some hydroponics systems are supported or held in place with growing media which does not supply the plants with required nutrients, but provides a mechanical support for the plant.

When implemented with efficacy, a hydroponics system saves water by 90%, compared to conventional irrigation systems for soil-based plants. Hydroponics systems further maximize plant production rate 3 to 10 times, as the nutrients are delivered directly from the water and insects associated with the soil are not present in hydroponics systems.

SUMMARY

An automated hydroponics system can be operated both indoors and outdoors to provide nutrient-fortified water for growing plants. The system includes a plant housing, a power source, a microcontroller, and a handheld device. The plant housing includes a platform for supporting a plant, a main solution container for storing water to be supplied to the plant, and a plurality of supplemental solution containers including a low pH solution container, a high pH solution container, a water container, and a nutrient solution container. The main solution container is connected to the supplemental solution containers by one or more water-supply conduits. The main solution container can include a pH level sensor configured for detecting pH levels in the main solution, a TDS sensor for detecting a level of total dissolved solids in the main solution a temperature sensor for monitoring a temperature of the main solution, a water level sensor for monitoring a level of the main solution, and one or more pumps. The microcontroller is configured for receiving data from the sensors and, when needed, modifying an amount, pH, temperature, and/or nutrient content of the nutrient-fortified water according to pre-determined parameters. The hand-held device can be configured to control the pumps remotely, send user notifications about the various parameters of the nutrient-fortified water collected by the sensors, and provide other information to the user about the plants.

These and other features of the present subject matter will become readily apparent upon further review of the following specification.

DETAILED DESCRIPTION OF THE PREFERRED EMBODIMENTS

Figure 1:
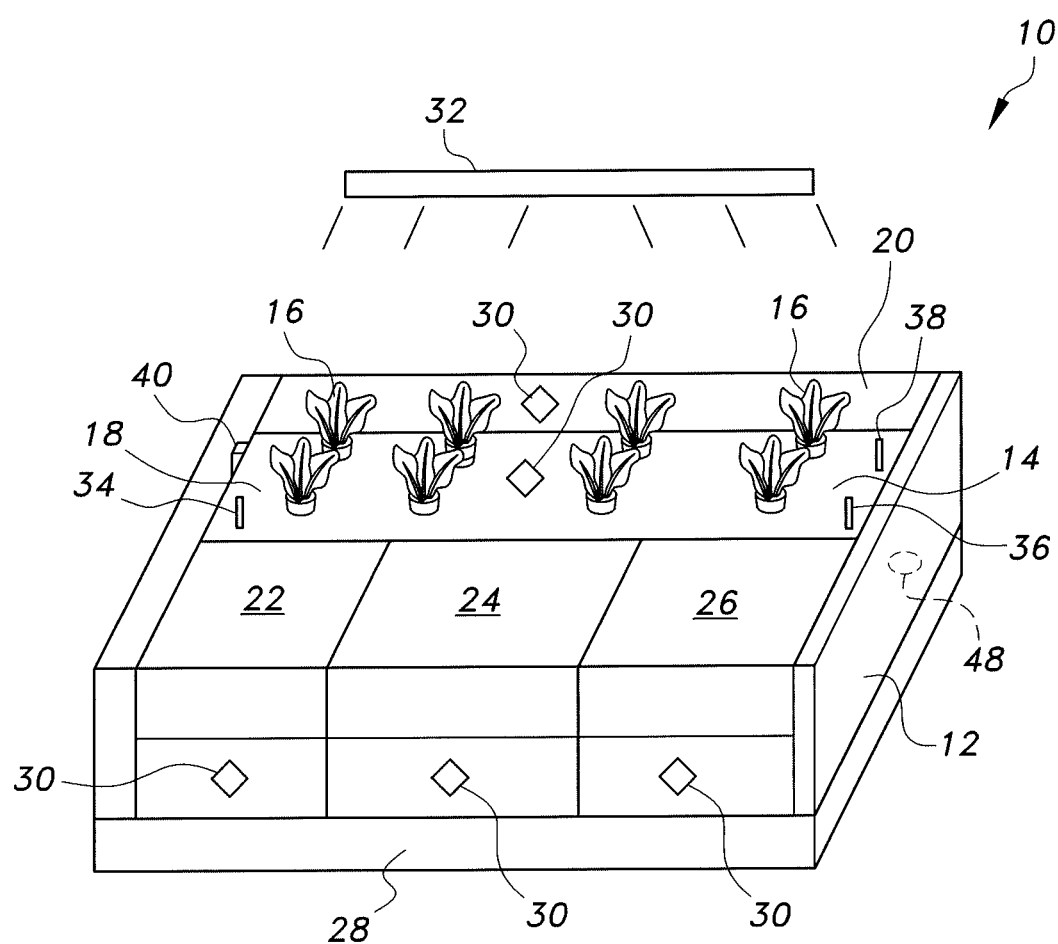
FIG. 1 is an environmental view of an embodiment of a hydroponics system according to the present teachings.
Figure 2:
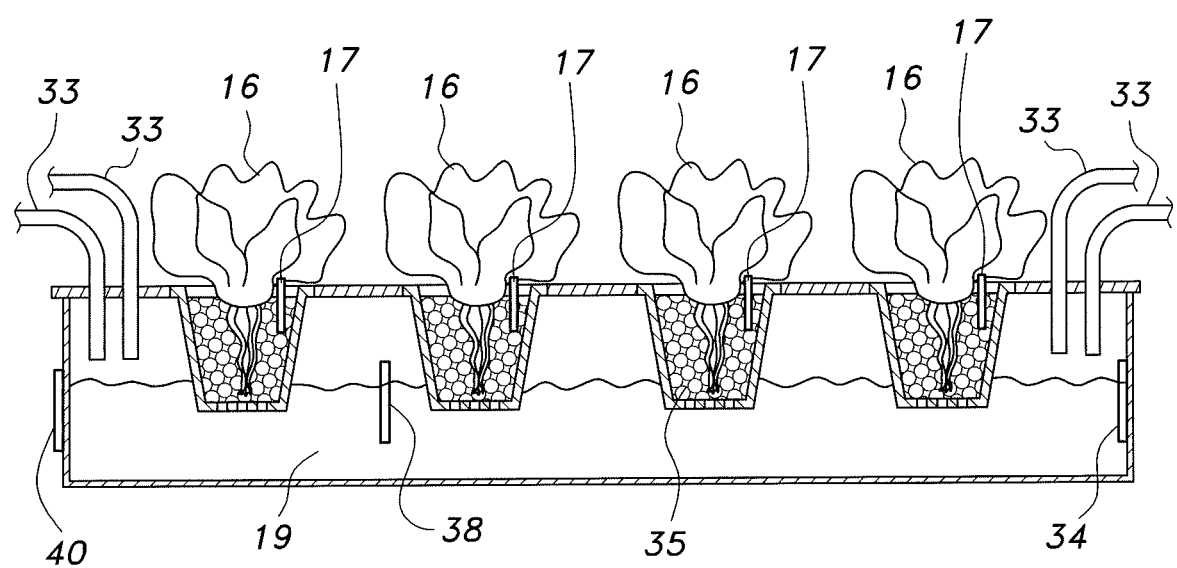
FIG. 2 is a side view of an embodiment of a hydroponics system.
Figure 3:
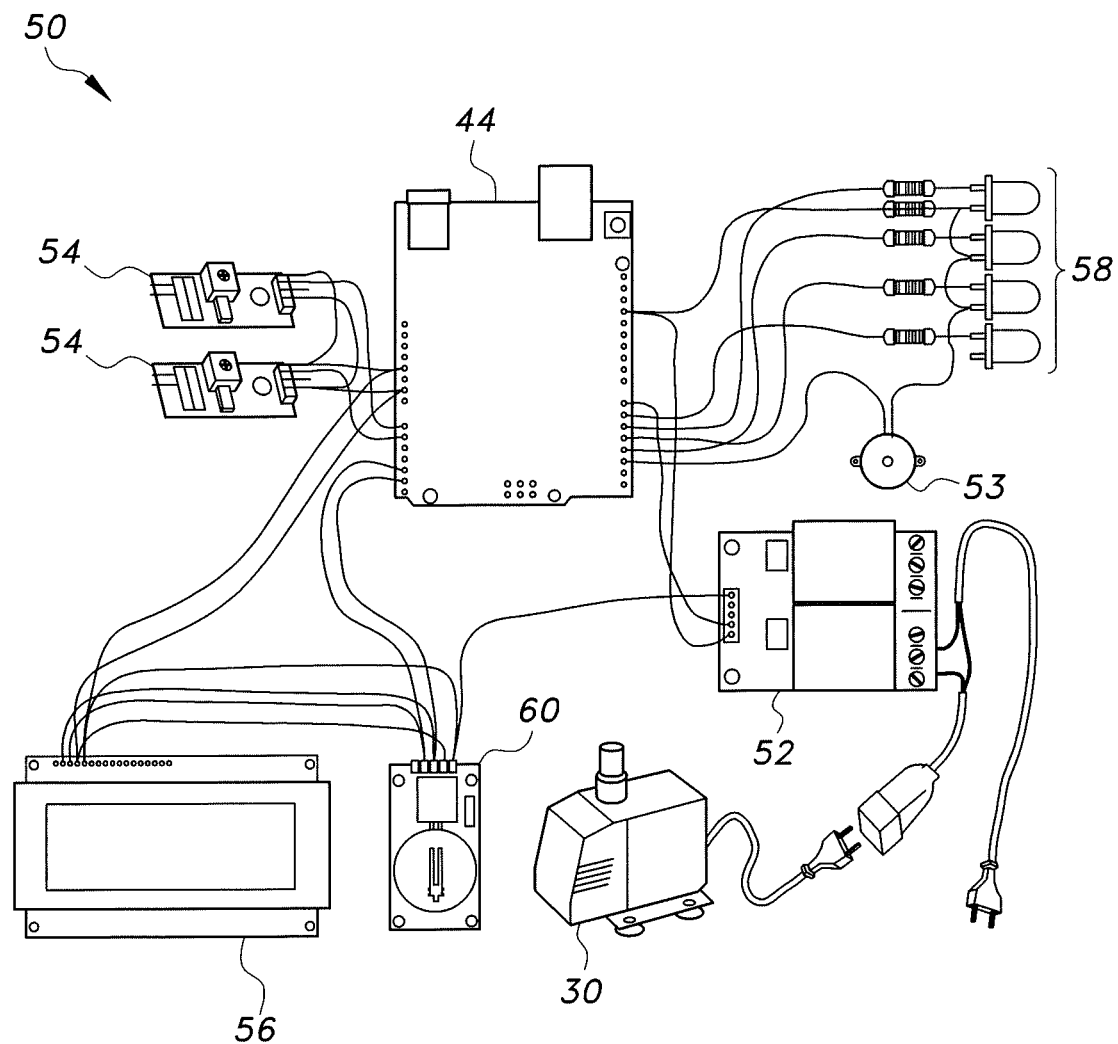
FIG. 3 is a diagram of an exemplary electronics system of the hydroponics system.
Figure 5:
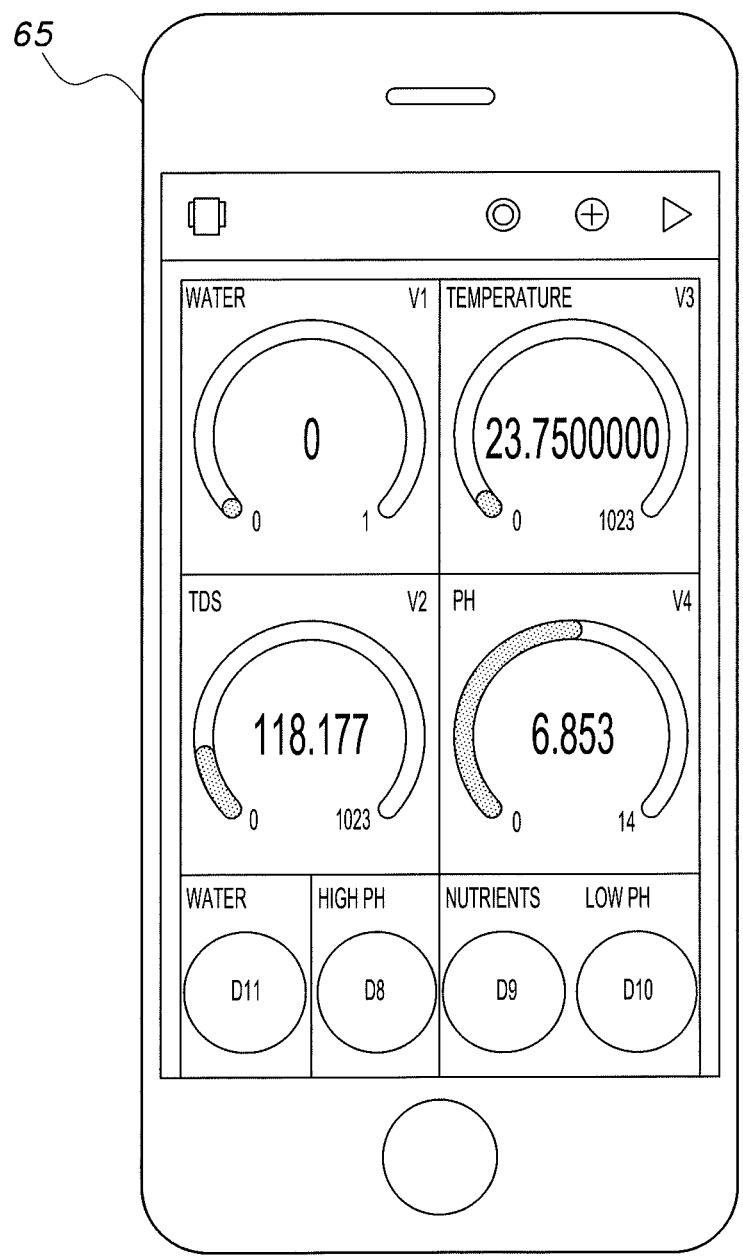
FIG. 5 is an exemplary handheld device of the hydroponics system.

An automated hydroponics system 10 can be operated both indoors and outdoors to provide nutrient-fortified water for growing plants. As shown in FIGS. 1, 2, and 5, the system includes a plant housing 12, a power source 13, a microcontroller 44, and a handheld device 65. The plant housing 12 includes a platform 14 for supporting upper portions of plants 16, a main solution container 18 for storing the solution to be supplied to the plants 16, a water container 20, a low pH solution container 22, a high pH solution container 24, and a nutrient solution container 26. Preferably, the dimensions of the plant housing 12 are 35 cm×50 cm×30 cm. In an embodiment, the system can include a lamp 32 to facilitate indoor use of the hydroponics system.

The main solution container 18 includes the main solution 19 or nutrient-fortified water that can be supplied by conduits 33 to the plants 16. The nutrients in the main solution can include nitrogen, potassium, and phosphorous, for example. The platform 14 includes openings through which roots of the plants may extend into the main solution 19. The roots may be supported by growing media or capillaric material 35. The main solution container 18 is connected to the low pH solution container 22, the high pH solution container 24, and the nutrient solution container 26 by respective supply conduits. In an embodiment, the high pH container 24, the low pH container 22, and the nutrients solution container 26 are all about the same size and positioned along a first side of the housing 12. The water container 20 is positioned along a side opposite the first side of the housing 12. The main solution container 18 is disposed between the water container 20 and containers 22, 24, 26. An aperture 48 is defined in the wall of the main solution container 18 above a desired liquid level height. When the level of liquid in the main solution container 18 exceeds the desired liquid level height, the excess liquid can flow through the aperture 48 and be channeled into a sink 28 at the bottom of the housing 12. The sink 28 can be configured as a removable drawer which can be removed from the housing 12 and emptied when needed.

The main solution container 18 includes at least one pH sensor 34 configured for detecting pH levels in the main solution 34, at least one TDS sensor 36 for detecting a level of total dissolved solids (TDS) in the main solution, at least one temperature sensor 38 for monitoring a temperature of the main solution, at least one water level sensor 40 for monitoring a level of the main solution, and one or more pumps 30. A moisture sensor 17 for monitoring the condition of the plants 16 can also be provided.

An electronics cabinet can be provided to house the hydroponics system's electronic system 50. Appropriate holes can be defined in the cabinet through which associated circuitry, e.g., wires of the sensors and pumps, may extend. An electric water pump relay 52 can control operation of the water pumps 30 based on the sensors' readings. In an embodiment, the microcontroller 44 is the microcontroller commercially sold under the name ARDUINO MEGA. In addition to the sensors, the microcontroller is connected to an LCD Display 56, a real-time clock (RTC) 60, the pump relay 52, a buzzer 53, an integrated circuit, such as an LM-393 driver 54, a plurality of light emitting diodes (LED) 58, and a buzzer 53.

Figure 4:
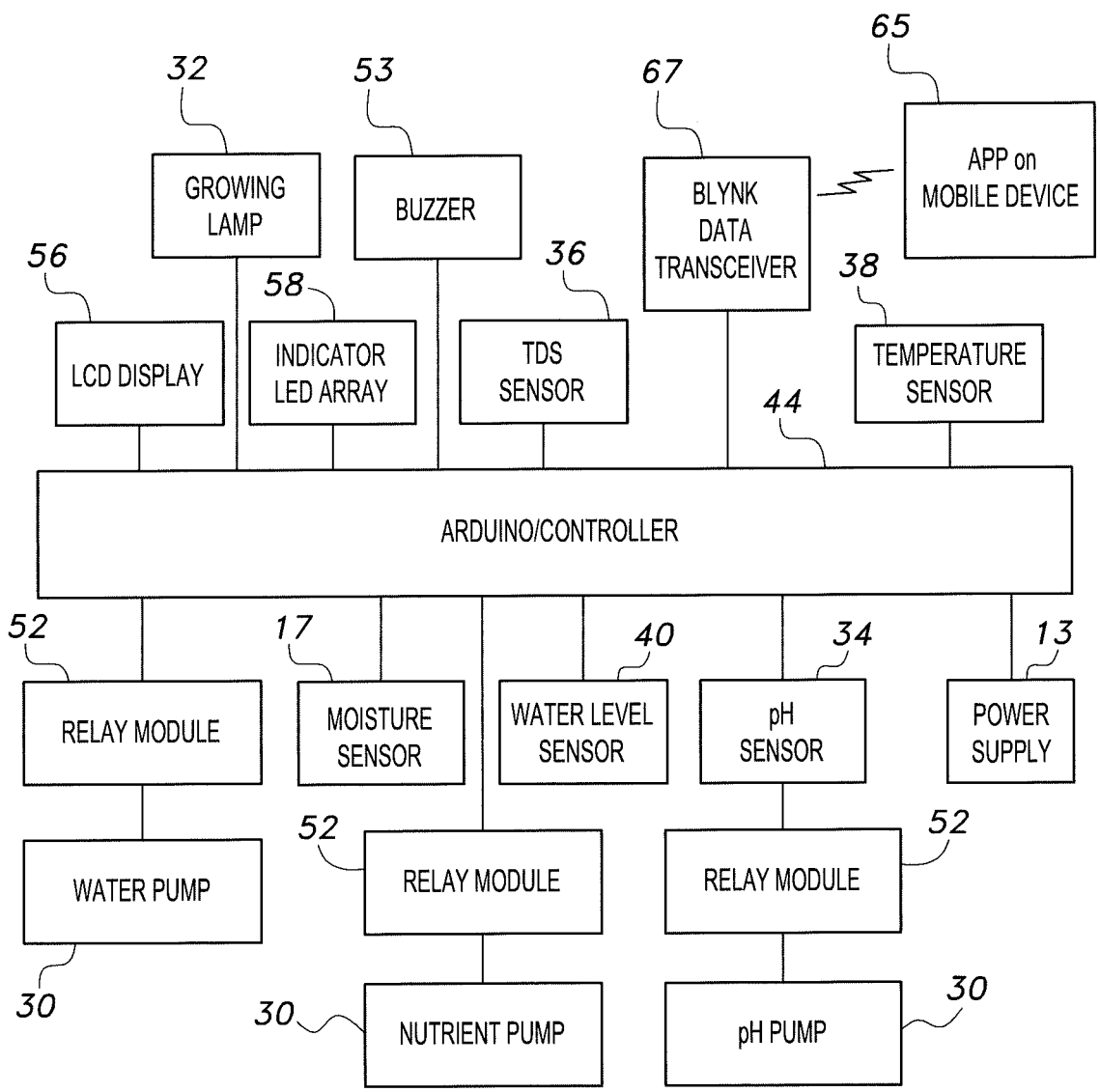
FIG. 4 is a block diagram showing operation of the hydroponics system.

As shown in FIG. 4, the microcontroller 44 is configured for receiving data from the sensors and, if needed, modifying an amount, pH, temperature, and/or content of the nutrient-fortified water according to pre-determined parameters. The smart-phone or other hand-held device can be configured to control the pumps remotely, send user notifications about the various parameters of the nutrient-fortified water collected by the sensors, and provide other information to the user about the plants The at least one liquid level sensor can include a first liquid level sensor placed just below the surface of the solution in the main solution container. The at least one liquid level sensor can be a non-contact liquid level sensor. In an embodiment, the at least one liquid level sensor is disposed about two inches below the surface of the main solution. If the liquid level falls below this specified level, the sensor outputs a LOW signal. The system responds to the LOW signal by pumping water until the desired water level is reached. If the sensor detects a level of the liquid increasing beyond a desired main solution level, the sensor outputs a HIGH signal, and an LED is turned on. The water level sensor can have a response time of 500 m/s. The water level sensor can include three pins. The first pin can be connected to the voltage common collector (VCC). The second pin can be connected to Ground. The third pin can be connected to the microcontroller.

The pH sensor can be used to detect the acidity of the solution. The pH sensor can have an accuracy of ±0.1 pH (25° C.) in solution. The pH sensor can include three pins, connected to VCC, Ground, and an analog pin of the microcontroller, respectively.

The total dissolved solutions (TDS) sensor can measure an amount of nutrients dissolved in the solution. The sensor has an accuracy of ±10% FS (25° C.). The TDS sensor can include three pins connected to VCC, Ground, and an analog pin of the ARDUINO MEGA, respectively.

The temperature sensor can be a thermocouple, e.g., K-type. The temperature sensor can be a waterproof sensor used to measure the temperature of the nutrient-fortified water. The sensor can have an error range of about 0.5° C.-2° C. The temperature sensor can include five connected pins. A first pin can be connected to the VCC. A second pin can be connected to Ground. Three remaining digital pins can be connected to the microcontroller, In an embodiment, five pumps are provided to maintain an appropriate growing environment for five corresponding plants. The pumps can be in communication with the water container, the low pH solution container, the high pH solution container, the nutrients solution container, and the main solution container. The pump provided in the main solution container can be controlled manually to change the main solution, if needed.

Air pumps can be provided to pump air through an air conduit to one or more air stones in the main solution container. The air stone can then diffuse air into the main solution container and, thereby, increase the water circulation and amount of oxygen in the main solution container.

The grow light can be operated in situations where ambient sunlight for plant growth is not available. The grow light can include a red light and a blue light. The blue light can provide the plants with healthy stems and leaves while the red light can facilitate flowering of the plants.

The power source can be a solar panel. A rechargeable battery and a solar charge controller connected to the solar cell and the rechargeable battery can be provided. In an embodiment, the solar panel is a 12.7 V solar panel. The solar panel is configured to recharge the batteries used to operate the system. The solar charge controller serves as a regulator between the solar cell and the battery.

The handheld device can be a smartphone 65, shown in FIG. 5. In an embodiment, the smartphone can link the microcontroller to a general purpose computer or personal computer (PC) using a USB interface which is compatible with suitable software programs. Preferably, ARDUINO IDE and BLYNK software 67 is used with the system. In an embodiment, Arduino IDE is used for the overall operation of the system, while Blynk is used to construct the smart phone application. The handheld device can be configured to remotely control the pumps for supplying the main solution with air or the necessary liquids and provide information to the user about the plant's growing environment, such as the temperature, level of the main solution, pH level, and TDS level. The smart phone application can give the user the ability to select the required amount of nutrient and pH level based on a table that shows the desired amount of nutrient and pH level for different plants.

As the system can provide an automated alternative for plant maintenance, the system can stimulate plant cultivation throughout society.

In operation, the microcontroller of the system is configured to continuously monitor pH level, total dissolved solids (TDS), water temperature, and liquid level in the main solution and initiate adjustments as needed. Preferably, the pH level of the main solution ranges from 5.5 to 6.5, the nutrients concentration (TDS level) of the main solution ranges from 400 ppm-700 ppm, the temperature of the main solution ranges from 18° C. to 26° C., and a level of the main solution is about two inches below the top surface of the growing media. If the pH of the main solution is lower than the desired range, the low pH solution can be pumped into the main solution through the respective supply conduit until the appropriate pH level is achieved. If the pH of the main solution is higher than this range, the high pH solution can be pumped into the main solution through the respective supply conduit until the appropriate pH level is achieved. Similarly, if the TDS level is below the desired range, a nutrient solution from the nutrient solution container can be pumped into the main solution through the respective solution conduit. If the TDS level is above the desired range, water can be pumped into the main solution through the respective conduit. If the temperature of the main solution is outside the desired range, a notification is sent to the user. If the main solution is not at the desired level as detected by the water level sensor, water can be pumped into the main solution. A second non-contact liquid level sensor, positioned at a lower level in the container, can detect even lower solution levels. If lower solution levels are detected, a notification can be sent to the user. If the main solution level is above the desired level, excess liquid from the main solution container can drain into the sink through the aperture defined at the appropriate level of the main solution container.

The block diagram shown in FIG. 4 illustrates the functionality of the system. The sensors send data to the microcontroller. Based on the data received, the microcontroller can regulate the nutrient level, pH level, temperature, and liquid level in the main solution. The microcontroller can send information to the handheld device, e.g., using the Blynk application.

In experiment, the Arduino IDE software was used to organize the function of the electrical components, such as controlling the pumps automatically and obtaining the sensors data, as well as for debugging purposes using a serial monitor. Arduino IDE is an open-source software that can provide a timer interrupt.

In experiment BLYNK software was used to develop the software application for the handheld device to manually control the pumps and display data to the user. Other suitable software that is compatible with Arduino IDE, available for Android and IOS, provides a simple way to build an application, is fast and reliable, and can be connected using standard USB interfaces can alternatively be used.

The system as shown was tested several times. Initially, the parts were tested separately before integrating them. The TDS sensor was tested by adding nutrient solution to water and, as expected, the sensor's reading increased. To double check the results, a TDS meter was used. The pH sensor was tested on different solutions and the readings changed according to the solution type. The values obtained confirmed that the sensor was working correctly and the time interval that the sensor took to detect the change was approximately 15 minutes. The temperature sensor was placed in hot, cold, and room temperature bodies of water and the values were sufficiently accurate. The non-contact liquid level sensor was tested to determine presence of a liquid and yielded a HIGH output resulting in the LED being turned on. In the absence of a liquid it yielded a LOW output and resulted in the LED being turned off. The pumps were switched ON or OFF using the smartphone. The data displayed in the application were the same as the ones obtained by the Arduino serial monitor. Also, suitable notifications were sent to the user to indicate when the water level was low and the temperature was either high or low.

The testing demonstrated that both the pH level and nutrients concentration can be balanced automatically. The smart phone application worked appropriately by enabling the control of the system distantly, showing the sensors' readings, and sending notifications to the user when needed.

Two node microcontroller (nodemcu) units can be provided to support Wi-Fi. In an embodiment, the user can select ranges for the pH and TDS based on the type of plant. In case the user does not know the suitable ranges to select, a schedule including the appropriate TDS and pH ranges for various plants can be provided. Also, the type of connectivity used in Blynk can be replaced by Wi-Fi instead of using serial ports.

It is to be understood that the system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A hydroponics system for stimulating and controlling plant growth, comprising:
 a plant housing including a platform having a plurality of openings defined therethrough, a main solution container for storing a solution including nutrients to be supplied to the plants, and a plurality of supplemental solution containers including a water container, a low pH solution container, a high pH solution container, a nutrient solution container, and a plurality of conduits extending between the main solution container and the supplemental solution containers;
 a sink for collecting excess water from the main solution container located in the plant housing directly beneath the main solution container and the plurality of supplemental solution containers, said sink being removable by being configured as a removable drawer which can be slid out of the plant housing and capable of being emptied when full;
 a power source;
 a microcontroller; and
 a handheld device.

2. The hydroponics system as recited in claim 1, wherein said main solution container includes a water level sensor, a pH sensor, a temperature sensor, and a TDS sensor.

3. The hydroponics system as recited in claim 2, wherein the nutrients in the main solution container include nitrogen, potassium, and phosphorous.

4. The hydroponics system as recited in claim 3, wherein the main solution container and each of the supplemental solution containers include a respective pump.

5. The hydroponics system as recited in claim 4, wherein:
 said pH sensor is configured to provide a reading to the microcontroller indicating pH level of the main solution,
 said water level sensor is configured to provide a reading to the microcontroller indicating a water level of the main solution,
 said temperature sensor is configured to provide a reading to the microcontroller indicating a temperature of the main solution, and
 said TDS sensor is configured to provide a reading to the microcontroller indicating a level of total dissolved solids in the main solution.

6. The hydroponics system as recited in claim 2, wherein said temperature sensor is a thermocouple k-type sensor.

7. The hydroponics system as recited in claim 1, wherein the power source is a solar panel.

8. The hydroponics system as recited in claim 7, further comprising a rechargeable battery and a solar charge controller, the solar charge controller being connected to the solar panel and the rechargeable battery.

9. The hydroponics system as recited in claim 1, wherein said handheld device is a smartphone.

10. The hydroponics system as recited in claim 1, further comprising a grow light, wherein said grow light is a blue light or a red light.

11. The hydroponics system as recited in claim 1, wherein the system further comprises air pumps and air stones.

12. The hydroponics system as recited in claim 1, wherein the system is configured to operate both indoors and outdoors.

13. The hydroponics system as recited in claim 1, wherein the system is configured to cultivate different types of hydroponic plants.

14. The hydroponics system as recited in claim 1, wherein the system is capable of being transported.

\* \* \* \* \*